US 6,618,168 B1

(12) United States Patent
Nakajima et al.

(10) Patent No.: US 6,618,168 B1
(45) Date of Patent: *Sep. 9, 2003

(54) IMAGE PROCESSING SYSTEM AND COMPUTER-READABLE RECORDING MEDIUM

(75) Inventors: Nobuyoshi Nakajima, Kanagawa-ken (JP); Shuichi Ohtsuka, Kanagawa-ken (JP); Norihisa Haneda, Saitama-ken (JP); Kazuo Shiota, Tokyo (JP); Shinji Itoh, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,356

(22) Filed: May 5, 1998

(30) Foreign Application Priority Data

May 7, 1997 (JP) .............................................. 9-116998
Apr. 30, 1998 (JP) .......................................... 10-119829

(51) Int. Cl.$^7$ ............................ G06F 15/00; G03F 3/10
(52) U.S. Cl. .................................... 358/1.16; 358/527
(58) Field of Search ................................ 358/527, 526, 358/506, 505, 487; 396/284, 314, 318, 319, 320; 355/28, 29

(56) References Cited

U.S. PATENT DOCUMENTS

| | | | | |
|---|---|---|---|---|
| 5,124,742 A | * | 6/1992 | Yoshikawa | 355/27 |
| 5,142,310 A | * | 8/1992 | Taniguchi et al. | 354/106 |
| 5,227,643 A | * | 7/1993 | Craig et al. | 250/566 |
| 5,311,251 A | * | 5/1994 | Roule et al. | 355/77 |
| 5,321,520 A | * | 6/1994 | Inga et al. | 358/403 |
| 5,608,542 A | * | 3/1997 | Krahe et al. | 358/449 |
| 5,696,576 A | * | 12/1997 | Itoh et al. | 355/40 |
| 5,761,558 A | * | 6/1998 | Patton et al. | 396/429 |
| 5,768,642 A | * | 6/1998 | Sugiyama et al. | 396/319 |
| 5,799,219 A | * | 8/1998 | Moghadam et al. | 396/319 |
| 5,896,293 A | * | 4/1999 | Teramoto et al. | 364/468.18 |
| 5,966,553 A | * | 10/1999 | Nishitani et al. | 396/303 |
| 5,978,016 A | * | 11/1999 | Lourette et al. | 348/64 |
| 6,053,405 A | * | 4/2000 | Irwin, Jr. et al. | 235/375 |
| 6,076,080 A | * | 6/2000 | Morscheck et al. | 705/400 |
| 6,092,023 A | * | 7/2000 | Kunishige | 702/1 |
| 6,202,092 B1 | * | 3/2001 | Takimoto | 709/225 |

* cited by examiner

*Primary Examiner*—Madeleine Nguyen
(74) *Attorney, Agent, or Firm*—Birch, Stewart, Kolash & Birch, LLP

(57) ABSTRACT

When order processing for printing image data is carried out by recording the image data and an order file in an order processing recording medium, history of orders is managed by the recording medium so that the content of past orders can be confirmed or new ordering information can be generated by using the past order content, for example. A flag showing whether or not an order file describing the content of an order, such as the quantity and the size, should be processed in a laboratory (whether the file is valid or invalid) is recorded in the recording medium together with the order file. By judging this flag by using an image handling apparatus of an image processing system, only valid order files are processed.

12 Claims, 4 Drawing Sheets

IMAGE PROCESSING SYSTEM AND COMPUTER-READABLE RECORDING MEDIUM

BACKGROUND OF THE INVENTION

1. Field of the Invention

The present invention relates to an image processing system such as a photograph finishing system and a computer-readable recording medium, and more specifically to an image processing system which automatically generates photographic print by obtaining print ordering information recorded as digital data in a FD, an MO disc, a Zip disc, or the like, and to a computer-readable recording medium wherein the ordering information is recorded.

2. Description of the Related Art

Photographic print ordering has been carried out conventionally by filling an order sheet with the name and address of an orderer, the frame number of a photograph to be printed, the quantity and the size of the print, and the like.

Following the recent digitization in the field of photographic services, it is becoming possible to order printing by recording image data read from a film and digitized thereafter in a recording medium such as an MO disc, a Zip disc, or a CD-R, instead of bringing a film. Alternatively, a method has been proposed wherein image data are registered in a server computer of a service provider in advance and printing order is placed without exchanging a recording medium.

Following this change, it has been proposed that ordering information, which has been handed from a customer to a service provider in the form of an order sheet, is handed as digital data.

Upon ordering a photograph, there is a general need that the content of the order is saved as history. This is because it saves time to refer to the content of a past order when a customer wishes to place an order again in the same content as before. Furthermore, an overlapping order due to poor memory is also avoidable by saving history.

When an order is placed by filling an order sheet, it is possible to save the history of how many times and which photograph has been ordered for additional printing by saving the copy of the order sheet. However, when the ordering information is handed as digital data, the ordering information recorded in a recording medium is automatically processed in a laboratory. Therefore, if ordering information generated in the past is left in the recording medium, the ordering information may be processed again regardless of the fact that it has already been processed. It is thus necessary to delete the past ordering information in order to securely avoid repeated processing. In other words, it has not been possible to save history of orders unless ordering information is intentionally managed by copying it on paper or transferring it to another medium, for example.

However, when an order sheet is saved, a film and the order sheet regarding photographs in the film are generally saved together. Likewise, in the case of digital data, a customer generally wishes to manage a recording medium wherein image data are stored together with order history regarding the image data stored in the recording medium. Especially, in the case where image data and ordering information are recorded together in a recording medium and a printing order is placed thereby, it is preferable for the ordering information to be saved as it is in the recording medium as history information.

SUMMARY OF THE INVENTION

Based on consideration of the problems described above, an object of the present invention is to realize easy management of order history, confirmation of the content of orders in the past as easily as in the case of an order using an order sheet, and generation of new ordering information by using the past order content.

To achieve the above object, the present invention records in a recording medium validity information showing whether an order file describing the content of an order such as a print size and the quantity is valid or invalid, that is, whether or not the order file should be processed by a laboratory, as a portion of the order file or data other than the order file, and this validity information used in an image processing system processes only valid order files.

In this manner, a past order file is not processed by a laboratory if the validity information therefor is invalid, even when the order file has been left in a recording medium, and the content of the order is saved as history in the recording medium.

In other words, the image processing system of the present invention comprises ordering information obtaining means which obtains ordering information by reading a recording medium wherein the ordering information which instructs generation of photographic print has been recorded as digital data in a predetermined format, and print generating means which carries out processing for generating the photographic print according to the ordering information obtained by the ordering information obtaining means, and the ordering information comprises at least one order file describing the content of an order and validity information for each order file showing whether or not the order file is valid. The order information obtaining means obtains only a valid order file whose validity information is valid upon reading the recording medium.

The recording medium herein referred to means a FD, a Zip disc, an MO disc or the like. The ordering information obtaining means means a personal computer comprising a medium drive for reading such a recording medium and an ordering information obtaining program operating on the personal computer, for example.

In the image processing system of the present invention, it is preferable that the ordering information obtaining means obtains only the order files whose validity information is valid and changes the validity information from valid to invalid upon reading the recording medium.

The validity information is changed from valid to invalid, because once the image processing system has processed an order file, the order file no longer needs to be processed, that is, the order file becomes an invalid file. The timing of the validity information change may be immediately after the ordering information has been taken in. Alternatively, the validity information may be changed after all image data to be printed have been transferred to the print generating means according to order processing.

Generation of the ordering information and recording thereof into a recording medium is carried out by a user by using order processing application software operating on a personal computer. The order processing application software can easily carry out processing such as specification of image data to be printed, or input of the quantity and the size of the print of the image data on a predetermined screen. This software organizes the information having been input by the user on the screen into digital data in a predetermined format, and records it in a recording medium. By such software running on the personal computer, the validity information is set as a portion of the ordering information automatically or according to an instruction by the user.

When an order file is newly generated, it is preferable for the validity information regarding the order file to be automatically set to valid. As has been described above, this validity information may be changed to invalid at the time of completion of the processing by the image processing system of the present invention.

Meanwhile, in order to reuse an order file having been used and processed in the past, a user may want to change the validity information setting from invalid to valid. In this case, the user intentionally changes the validity information from invalid to valid by using a function of the above software. Alternatively, a user can change validity information from valid to invalid by using this function, in the case where an order file has been generated but the user wants to postpone the processing thereof, for example.

The image processing system of the present invention generates print by automatically judging an order file to be processed by obtaining only the order files whose validity information, which shows whether the order file describing the content of the order is valid or invalid, is valid. For this reason, an order file having been processed will not be processed by mistake, even when an order is placed by an order file to be used for the order coexisting in a recording medium with an order file having been processed. Therefore, a past order file can be saved as it is in an order placing recording medium, and the history of orders is easily managed by the recording medium.

Furthermore, when this image processing system has processed a valid order file, it automatically changes the validity information showing the validity of the order file from valid to invalid. Therefore, a user will not need to operate the validity information intentionally without a special reason.

DESCRIPTION OF THE PREFERRED EMBODIMENT

Hereinafter, an embodiment of an image processing system of the present invention will be explained with reference to the accompanying drawings.

Figure 1:
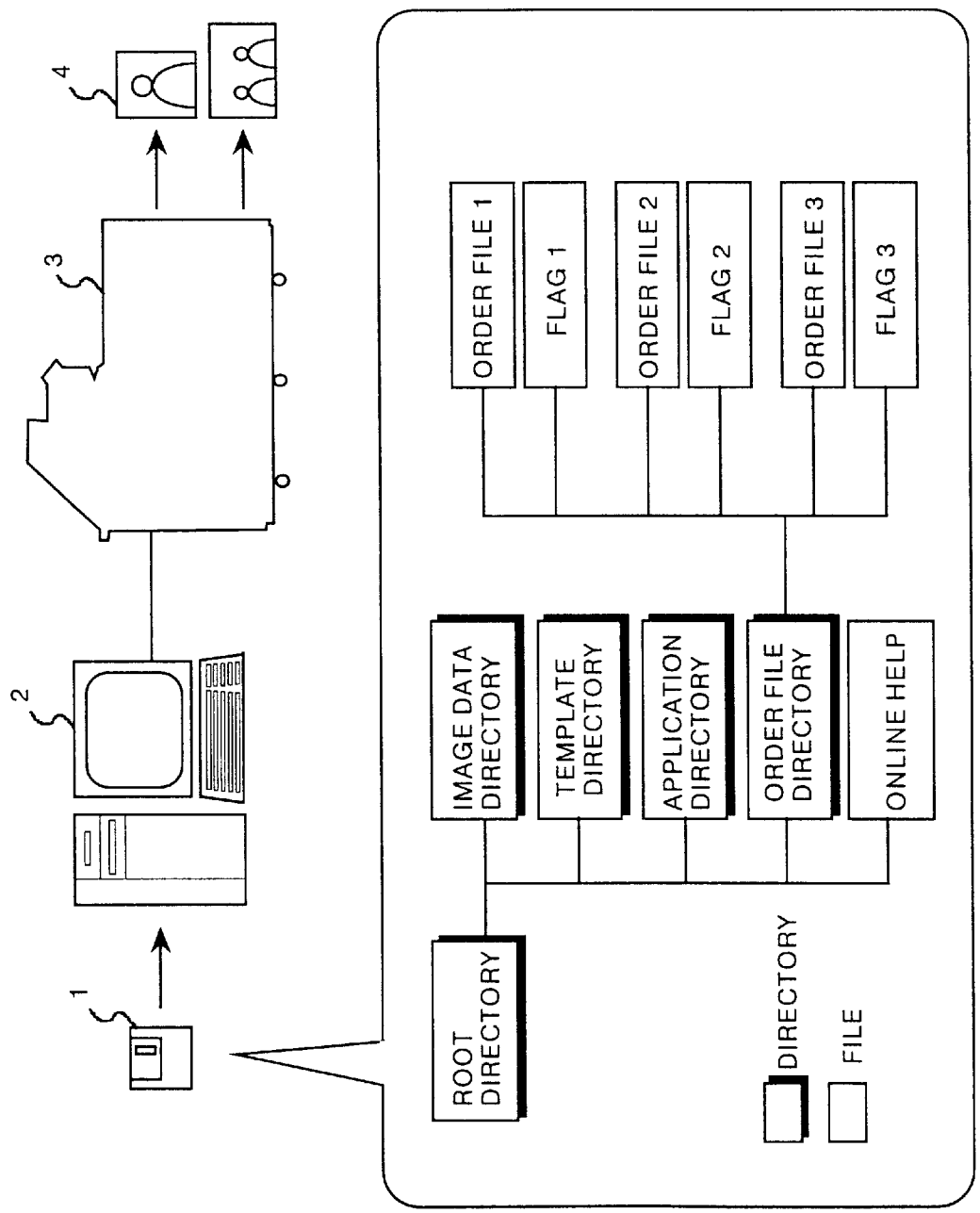
FIG. 1 is a diagram showing an outline of a photograph finishing system which is an embodiment of an image processing system of the present invention.

FIG. 1 is a diagram showing an outline of a photograph finishing system which is an embodiment of the image processing system of the present invention. As shown in this figure, this photograph finishing system comprises an image handling apparatus 2 for obtaining image data and ordering information, and a photographic printer 3 which outputs the image data as photographic print 4 according to the ordering information.

Figure 2:
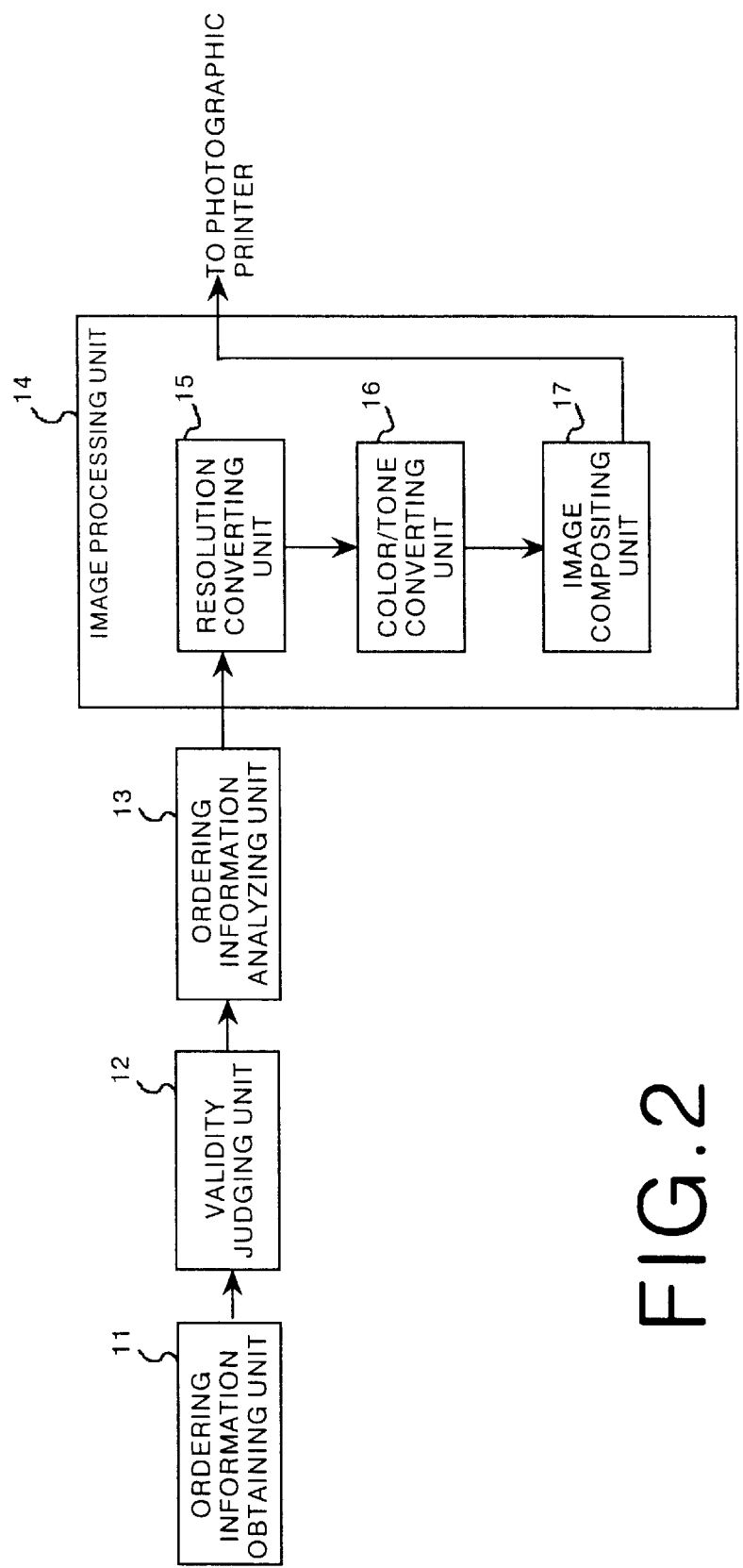
FIG. 2 is a block diagram showing a configuration of an image handling apparatus.

FIG. 2 is a block diagram showing a configuration of the image handling apparatus 2. In the present embodiment, the image handling apparatus 2 is a personal computer or a general purpose computer such as a work station, and comprises an ordering information obtaining unit 11. The information obtaining unit 11 may be a drive for reading image data and ordering information recorded in a floppy disk (FD), a Zip disc, a magneto-optic (MO) disc, or the like, a validity judging unit 12 which judges the validity of a flag included in the ordering information, an ordering information analyzing unit 13 which analyzes the ordering information, and an image processing unit 14 which generates image data for printing based on the analysis result by the ordering information analyzing unit 13. The image processing unit 14 comprises a resolution converting unit 15 which carries out pixel size adjustment of image data, a color/tone conversion unit 16 which converts the image data so that the color or tone thereof becomes suitable for printing, and an image compositing unit 17 which carries out synthesis of the image data with a template or a clip art for example, and layout processing such as trimming. The image data to be printed may not necessarily be obtained from a recording medium. The image data may have been recorded in a hard disc of the image handling apparatus 2. In this case, the image handling apparatus 2 reads ordering information alone from a FD or the like, searches the hard disc for the image data based on the ordering information, and transfers the image data to be printed to the photographic printer 3.

In this embodiment, a recording medium which is provided to a customer by a service provider when the service provider carries out a digital output service is used as a recording medium 1 for order processing. More specifically, a recording medium which is provided when photographs recorded on a film by a customer have been first-printed and output as digital image data in the recording medium will be used.

This recording medium is supposed to have four directories under a root directory, namely an image data directory, a template directory, an application directory, and an order file directory, as shown in FIG. 1 for example. The image data directory is a directory storing original image data having been read from a film at a service provider and digitized there, and image data which have been generated by a customer by processing the original image data by using a personal computer or the like. The printing target can be specified among the image data stored under the image data directory.

The template directory stores templates for generating postcards or calendars. The application software directory is to store image data editing software and order processing software. These two directories store files provided from a service provider to a customer.

The order file directory stores an order file and ordering information comprising a flag as validity information showing whether the order file is valid or invalid. The information is generated by a customer by using the order processing software stored in the application software directory, and recorded in a recording medium.

Figure 3:
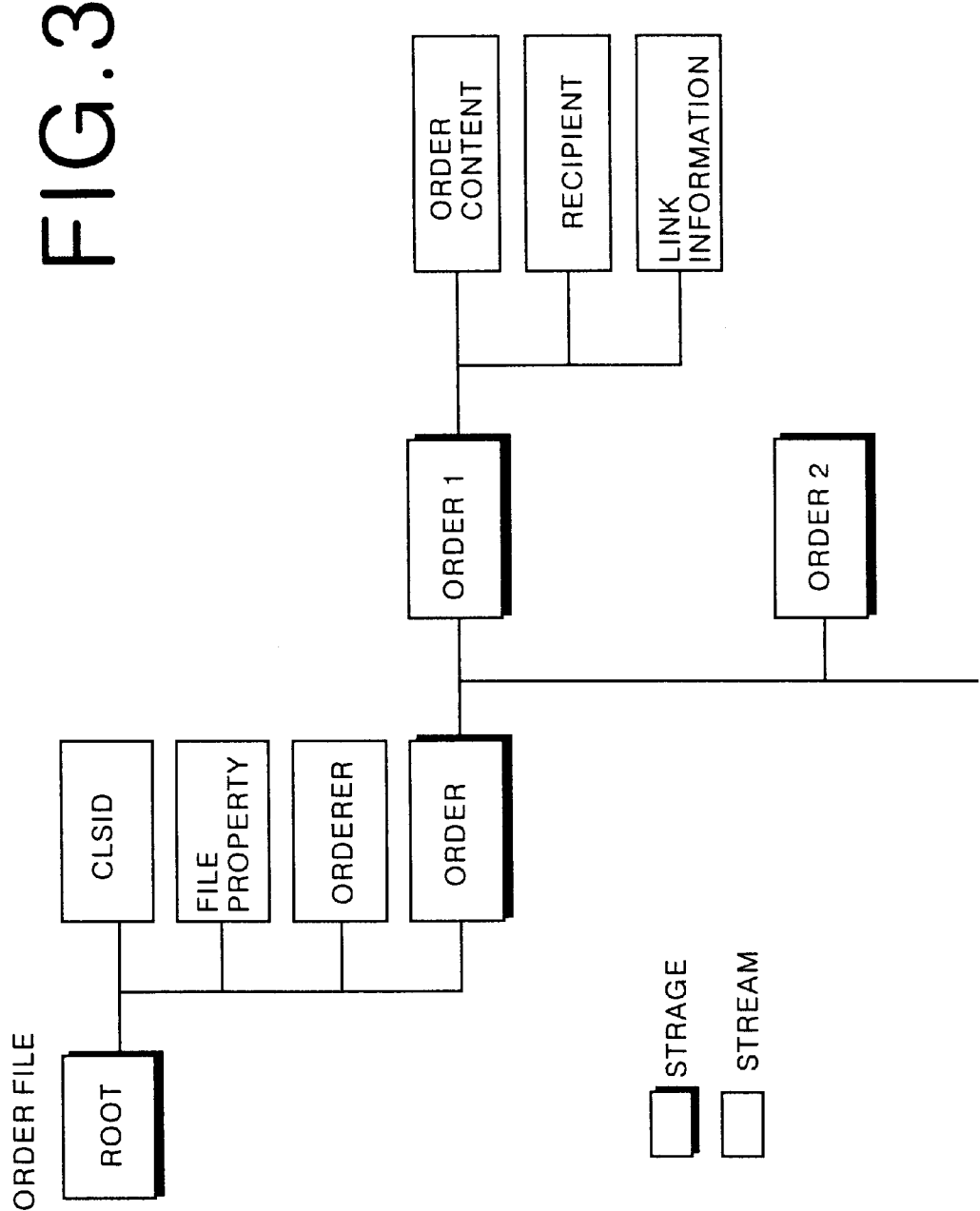
FIG. 3 is a diagram showing an example of an order file.

In the present embodiment, the order file is a structured storage file as shown in FIG. 3. Under a root storage, the order file has an object class identifier (CLSID), property information of the order file, a stream showing information regarding an orderer, and a storage storing specific information regarding an order. The storage comprises an order storage corresponding to an order one to one. Each order storage comprises an order content stream describing the quantity and the size of print and so on, a recipient stream describing information regarding a recipient of the print, and a link information stream linking to image data to be printed.

The recipient stream is used in the case where additional print is ordered so that the print is distributed to the orderer's friends, for example.

The flag showing whether an order file is valid or invalid may be described in the above stream as a portion of the order file property information, or may be managed as a file different from the order file describing the ordering information, as shown in FIG. 1. In the former case, a small file size is advantageous, while in the latter case it is advantageous that an order file itself generated by a customer does not need to be updated.

The image handling apparatus 2 judges an order file valid if the flag property thereof is 0, and transfers image data to be printed to the photographic printer 3 in order to generate photographic print of the image data specified by the order file. The transferred image data are input in a queue of the photographic printer 3 and sequentially output as print. If the flag property is not 0, the image handling apparatus 2 judges the order file as a history file in the past and skips the file. The image handling apparatus 2 then refers to the property of the following order file.

Figure 4:
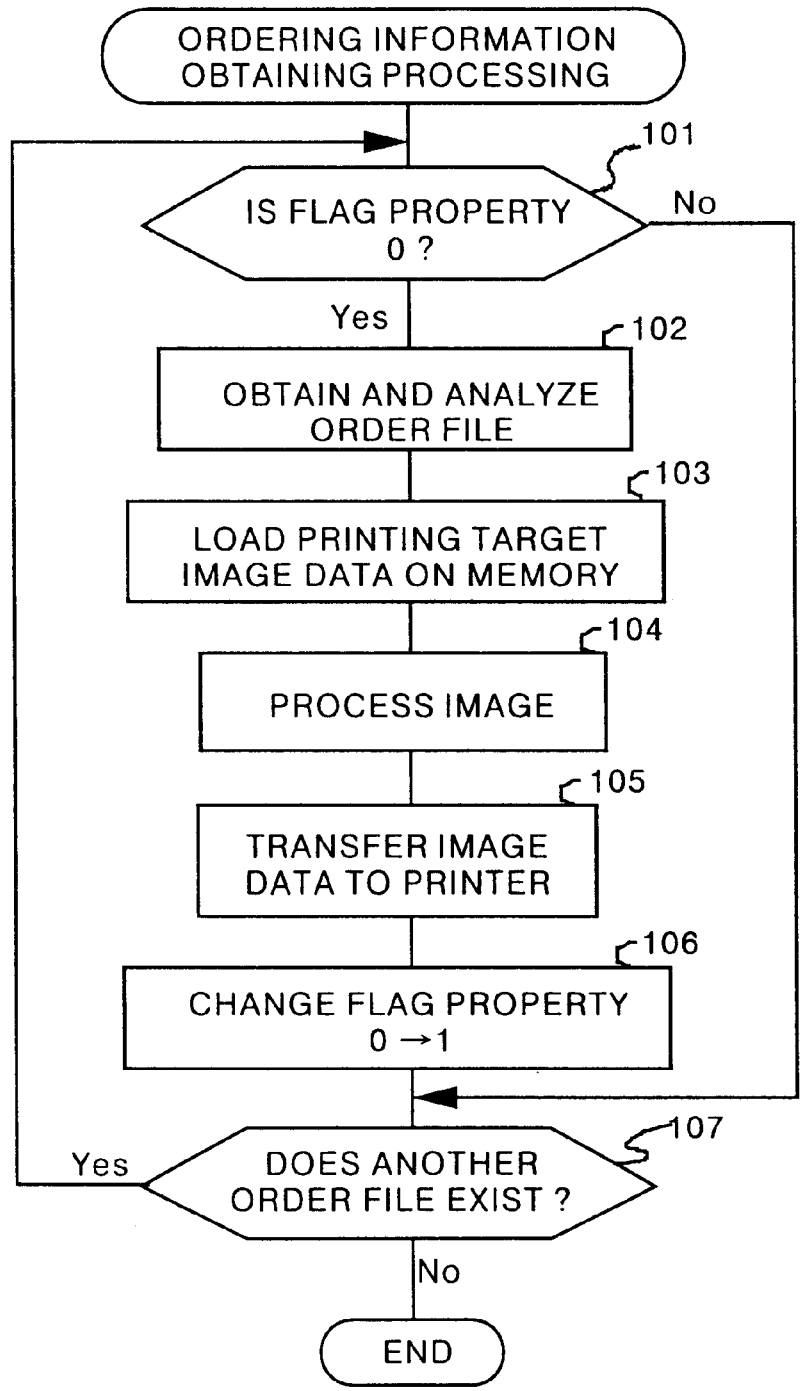
FIG. 4 is a flow chart showing an example of ordering information obtaining processing.

FIG. 4 is a flow chart showing the ordering information obtaining processing carried out by the image handling apparatus 2 as has been described above. After ordering information has been obtained by the ordering information obtaining unit 11, the flag property of the order file is judged by the validity judging unit 12 at a step 101. If the property is 0, the order file is input and analyzed by the ordering information analyzing unit 13, and the orderer information, specific content of the order, and the like are taken into the system at a step 102. At a step 103, according to the instruction by the order file, image data specified as a printing target are searched for and loaded in a memory of the system. At a step 104, predetermined image processing or the image processing specified by the order file is carried out on the loaded image data by the image processing unit 14. The processed image data are transferred to the printer 3 at a step 105, and at a step 106, the flag property of the order file having been processed is changed from 0 to 1 at the completion of the transfer. At a step 107, it is confirmed whether or not another order file exists in the order processing recording medium and if there is, the above processing is repeated on the order file. If the flag property at the step 101 is not 0, only the processing at the step 107 is carried out, and the processing at the steps from 102 through 106 is not carried out.

The flag property change at the step 106 may be carried out at the time the order file is input from the recording medium, that is, immediately after the step 102.

The flag change from valid to invalid (from 0 to 1) is carried out automatically by the image processing system of the present invention, as has been described above. However, the change from invalid to valid is not carried out automatically unless a user does so intentionally. For example, when an order file having been processed is used again for order processing, the flag thereof is intentionally changed from 1 to 0 by using a function of the order processing software stored in the application directory. The flag property change is not necessarily carried out and the processing may be finished without the flag change from 0 to 1.

As has been described above, the photograph finishing system according to the embodiment of the present invention judges whether or not an order file should be processed by the flag which is set for showing the validity of the order file as a portion of the order file property, instead of judgment based on whether or not an order file exists in a recording medium. Therefore, order files having been processed may be saved as they are in a recording medium, which leads to easier management of order history.

Furthermore, in the above embodiment, a flag is used as the validity information showing validity of an order file, which is not necessarily limited to this example. A time stamp which shows the time of an order file generation may be used as the validity information. In this case, only an order file whose time stamp upon generation of the order file is the latest is taken into the image handling apparatus 2 as a valid order file. The time stamp upon image data printing may be included in the order file by the image handling apparatus 2, and the time stamp upon the printing may be used as the validity information. In this case, upon receiving an order, the time stamp at the time of the order file generation is compared with the time stamp upon the printing. If the time stamp upon generation of the order file is older than the time stamp of upon the printing, the order file is judged to be invalid, while valid if newer.

What is claimed is:

1. An image processing system comprising:

an ordering information reader for obtaining print ordering information by reading a computer storage medium storing digital image data for at least one photographic image, digital print ordering information, which comprises multiple print orders each describing the content of a print order for said digital image data, and file validity indicator information indicating whether or not a corresponding print order is valid, such that said computer storage medium stores a new print order for said digital image data without revising a previously-stored print order for said digital image data, even when said new print order contradicts said previously-stored print order, and said digital print ordering information represents print order history information indicating a history of multiple print orders for said digital image data;

a printer for processing and for generating at least one photographic print according to the obtained print ordering information; and a validity judging unit for evaluating file validity indicator information on the computer storage medium, the validity judging unit selecting a print order for reading by the reader based upon the evaluation of the file validity indicator information.

2. The image processing system as claimed in claim 1, wherein the ordering information reader obtains only the print order whose validity indicator information is valid and also changes the validity indicator information thereof from valid to invalid upon reading the computer storage medium.

3. A computer-readable recording medium storing digital image data for at least one photographic image and digital print ordering information instructing photographic print generation for said digital image data, said digital print ordering information comprising multiple print orders each describing the content of a print order for said digital image data and validity information indicating whether a corresponding print order is valid or invalid, such that said computer-readable recording medium stores a new print order for said digital image data without revising a previously-stored print order for said digital image data, even when said new print order contradicts said previously-stored print order, and said digital print ordering information represents print order history information indicating a history of multiple print orders for said image data.

4. An image processing system comprising:

a reader for reading digital image data for at least one photograph image, digital print ordering information and a file validity indicator organized as at least one file on a computer storage medium, the file validity indicator being associated with the digital print ordering information, said digital print ordering information stored on said computer storage medium including multiple print orders for said digital image data such that said computer storage medium stores a new print order for said digital image data without revising a previously-stored print order for said digital image data, even when said new print order contradicts said previously-stored print order, and said digital print ordering information represents print order history information indicating a history of multiple print orders for said digital image data;

a validity judging unit for evaluating the file validity indicator and selecting a print order from the digital print ordering information based upon the evaluation of the file validity indicator; and an image processing unit processing the digital image data in accordance with the selected print order.

5. The image processing system according to claim 4 wherein the digital print ordering information and the file validity indicator are organized into the at least one file including a flag as the file validity indicator.

6. The image processing system according to claim 4 wherein the digital print ordering information comprises a first file and wherein the file validity indicator comprises a second file associated with the first file.

7. The image processing system according to claim 4 wherein the digital print ordering information and the file validity indicator are stored as a pair of corresponding files within an order file directory.

8. The image processing system according to claim 4 wherein the file validity indicator comprises:

a time stamp generated upon recording of the ordering information.

9. The image processing system according to claim 4 wherein the file validity indicator comprises a time stamp generated at a printing time subsequent to processing by the image processing unit.

10. The image processing system according to claim 4 wherein the file validity indicator comprises a combination of a first time stamp indicating a recording time of the corresponding print order on the computer storage medium and a second time stamp indicating a printing time of the image data and wherein the validity judging unit compares the first time stamp with the second time stamp to determine whether the print order is valid.

11. The image processing system according to claim 10 wherein the ordering information obtaining unit is adapted to designate a print order as valid if the first time stamp is newer than the second time stamp.

12. The image processing system according to claim 10 wherein the validity judging unit is adapted to designate a print order as invalid if the first time stamp is older than the second time stamp.

* * * * *